(12) United States Patent
Chow

(10) Patent No.: US 10,086,705 B2
(45) Date of Patent: Oct. 2, 2018

(54) MULTIPOINT EMERGENCY RESPONDER SAFETY ISOLATION SYSTEM

(71) Applicant: Toyota Motor Engineering & Manufacturing North America, Inc., Erlanger, KY (US)

(72) Inventor: Justin J. Chow, Los Angeles, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 154 days.

(21) Appl. No.: 15/195,958

(22) Filed: Jun. 28, 2016

(65) Prior Publication Data

US 2017/0368941 A1  Dec. 28, 2017

(51) Int. Cl.
*B60L 3/04* (2006.01)
*B60L 3/00* (2006.01)
(Continued)

(52) U.S. Cl.
CPC .......... *B60L 3/0007* (2013.01); *B60L 3/0046* (2013.01); *B60L 3/0069* (2013.01); *B60L 3/04* (2013.01); *B60L 3/12* (2013.01); *B60L 11/02* (2013.01); *B60L 11/1811* (2013.01); *B60L 11/1853* (2013.01); *B60L 11/1864* (2013.01); *B60L 11/1868* (2013.01); *H02J 9/061* (2013.01); *H02M 7/44* (2013.01); *B60L 2210/30* (2013.01); *B60L 2240/70* (2013.01); *B60L 2250/12* (2013.01); *B60L 2250/16* (2013.01);
(Continued)

(58) Field of Classification Search
CPC .... B60L 3/0007; B60L 3/0046; B60L 3/0069; B60L 3/04; B60L 3/12

USPC .................................................. 307/9.1, 10.1
See application file for complete search history.

(56) References Cited

U.S. PATENT DOCUMENTS 6,417,579 B1 * 7/2002 Lehnst .................. B60K 28/14
180/282
6,828,755 B1  12/2004 Iverson et al.
(Continued)

FOREIGN PATENT DOCUMENTS

DE  102012204828  9/2013
EP       1151892  11/2001
(Continued)

OTHER PUBLICATIONS

"Emergency Response Guide 2014-2015 Accord Hybrid". 2015.*
(Continued)

*Primary Examiner* — Levi Gannon
(74) *Attorney, Agent, or Firm* — Snell & Wilmer LLP

(57) ABSTRACT

Methods, systems, and apparatus for a multipoint safety isolation system. The multipoint isolation system includes one or more isolation triggers that connect to multiple low voltage (LV) battery components and multiple high voltage (HV) battery components. The multiple LV battery components include an LV battery. The multiple HV battery components include multiple HV batteries. The one or more isolation triggers are configured to isolate at least one of the LV battery from the multiple HV batteries or a first subset of the multiple HV batteries from a second subset of multiple HV batteries. The multipoint isolation system includes an electronic control unit (ECU) configured to activate the one or more isolation triggers.

18 Claims, 7 Drawing Sheets

(51) Int. Cl.
   *B60L 3/12*    (2006.01)
   *B60L 11/02*   (2006.01)
   *B60L 11/18*   (2006.01)
   *H02J 9/06*    (2006.01)
   *H02M 7/44*    (2006.01)

(52) U.S. Cl.
   CPC ........ *Y02T 10/7005* (2013.01); *Y02T 10/7061* (2013.01); *Y02T 10/7066* (2013.01); *Y02T 10/7291* (2013.01); *Y02T 90/16* (2013.01)

(56) References Cited

U.S. PATENT DOCUMENTS

| | | |
|---|---|---|
| 8,129,951 B2 | 3/2012 | Turner et al. |
| 8,587,907 B2 | 11/2013 | Gaben |
| 8,612,073 B2 | 12/2013 | Fuji et al. |
| 9,209,628 B2 | 12/2015 | Thieme et al. |
| 9,221,343 B2 | 12/2015 | Tokarz et al. |
| 9,278,619 B2 | 3/2016 | Stadler et al. |
| 9,623,754 B2 * | 4/2017 | Izumi .................. B60L 3/12 |
| 2011/0288700 A1 | 11/2011 | Pebbles |
| 2011/0304202 A1 * | 12/2011 | TenHouten ............ B60R 16/03 307/10.1 |
| 2012/0081221 A1 | 4/2012 | Doerr et al. |
| 2013/0264325 A1 * | 10/2013 | Nemesh ................ B60L 1/02 219/202 |
| 2013/0307476 A1 | 11/2013 | Darragh et al. |
| 2014/0002021 A1 | 1/2014 | Bertness |
| 2014/0015492 A1 | 1/2014 | Namou et al. |
| 2014/0042806 A1 | 2/2014 | Gless |
| 2014/0070772 A1 | 3/2014 | Andres et al. |
| 2014/0339892 A1 | 11/2014 | Gendlin et al. |
| 2016/0111758 A1 * | 4/2016 | Stimm ............... H01M 10/482 324/430 |

FOREIGN PATENT DOCUMENTS

| | | |
|---|---|---|
| EP | 2393178 | 12/2011 |
| WO | WO 2015/022198 | 2/2015 |

OTHER PUBLICATIONS

Edelstein, Stephen. "Tesla Model S Versions: What Are Your Different Options?" https://www.greencarreports.com/news/1099185_tesla-model-s-versions-what-are-your-different-options. Jul. 19, 2015.*

BMW Group "Sichereitskonzepte Elektriflzierte Fahrzeuge AM Beispiel BMW 13" Apr. 16, 2015.

* cited by examiner

MULTIPOINT EMERGENCY RESPONDER SAFETY ISOLATION SYSTEM

BACKGROUND

1. Field

This disclosure relates to a system and a method that isolates electrical components of a vehicle.

2. Description of the Related Art

Hybrid, plug-in hybrid and electric vehicles have high voltage and low voltage electrical systems that power the vehicle. Typically, a high voltage electrical system powers the electric motor, generator and inverter while all other conventional automotive electrical devices, such as the headlights, radio, and gauges are powered using a separate low voltage electrical system, such as a 12 V battery. Numerous safeguards are designed into the vehicle to ensure that the electrical systems are kept safe in an accident, such as easily identifiable high voltage cables, a service plug and sealed batteries.

In an emergency situation or accident, such as a vehicle collision or fire, an emergency responder activates a physical isolation trigger. The physical isolation trigger requires an emergency responder to access, cut and remove a segment of an electrical cable, remove a fuse from a fuse panel and/or remove a service plug. However, an emergency responder must locate and physically activate these physical isolation triggers to disable the electrical system. A physical isolation trigger may be located in numerous different locations for different types of vehicles, and physical obstacles may prevent an emergency responder from directly accessing the physical isolation triggers immediately. Time is lost searching for and activating the physical isolation triggers.

Accordingly, there is a need for a system and method for a multipoint safety responder isolation system that improves the ability to disable and/or isolate the electrical systems of a vehicle.

SUMMARY

In general, one aspect of the subject matter described in this disclosure is embodied in a multipoint safety isolation system for a vehicle. The multipoint isolation system includes one or more isolation triggers connected to multiple low voltage (LV) battery components and multiple high voltage (HV) battery components. The multiple LV battery components include an LV battery. The multiple HV battery components include multiple HV batteries. The one or more isolation triggers are configured to isolate at least one of the LV battery from the multiple HV batteries or a first subset of the multiple HV batteries from a second subset of multiple HV batteries. The multipoint safety isolation system includes an electronic control unit (ECU) configured to activate the one or more isolation triggers.

These and other embodiments may optionally include one or more of the following features. The multipoint safety isolation system may include a user device that has a user display and one or more external databases. The user device may be configured to obtain a schematic of the vehicle from the one or more external databases and display an indicator for a respective location for each of the one or more isolation triggers. The multipoint safety isolation system may include a network that connects the user device to at least one of the electronic control unit or the one or more external databases.

The one or more external databases may store multiple schematics for multiple vehicles. Each schematic may correspond to a respective vehicle and may describe the location of each of the isolation triggers of the respective vehicle.

The user device may be configured to display a user interface element for activating an isolation trigger. The user device may receive a selection of the user interface element and send a signal to activate the isolation trigger. The one or more isolation triggers may be configured to disconnect one or more electrical connections between the LV battery and the HV batteries, disconnect one or more electrical connections between the first subset of HV batteries and the second subset of HV batteries, and shutoff generation of electrical power. The one or more isolation triggers may cause a short of a circuit to blow a mechanical fuse to disconnect the one or more electrical connections.

The one or more isolation triggers may be configured to toggle one or more electrical relays or switches connected between the first subset of the plurality of HV batteries and the second subset of the plurality of HV batteries, so that the first subset and the second subset are electrically segregated into different battery packs that each compose of at least one HV battery.

The multipoint safety isolation system may include one or more impact collision sensors configured to detect impact data. The electronic control unit may be configured to compare the impact data to a threshold value and determine that there was an impact based on the comparison. The electronic control unit may trigger activation of at least one of the one or more isolation triggers in response to determining that there was an impact. The multipoint safety isolation system may have one or more indicators that are configured to indicate a location for each of the one or more isolation triggers. The one or more indicators may include at least one of a pathway of lights that lead to at least one of the one or more isolation triggers or an audio beacon. The one or more isolation triggers may be configured to segregate the multiple HV batteries into multiple subsets having an equivalent amount of voltage.

In another aspect, the subject matter is embodied in a method for isolating one or more batteries of a vehicle. The method may include detecting, using one or more sensors, impact collision data and comparing the impact collision data to a safety margin. The method may include determining that the impact collision data exceeds the safety margin and activating one or more indicators that each indicate a respective location of a respective isolation trigger. The method may include obtaining a signal to activate one or more isolation triggers that includes the respective isolation trigger.

In another aspect, the subject matter is embodied in a system for multipoint safety isolation system. The multipoint safety isolation system includes a first set of one or more isolation triggers for a first vehicle and a second set of one or more isolation triggers for a second vehicle. The sets of one or more isolation triggers may be configured to isolate at least a LV battery from multiple HV batteries or a subset of the multiple HV batteries from another subset of the multiple HV batteries of their respective vehicles. The first set of the one or more isolation triggers may be configured to be positioned in a particular location of the first vehicle and the second set of the one or more isolation triggers may be configured to be positioned in a substantially similar location on the second vehicle as the particular location of the first vehicle.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles and methods for implementing, disabling and isolating electrical components. Particular embodiments of the subject matter described in this disclosure may be implemented to realize one or more of the following advantages. A multipoint safety isolation system isolates and disables various electrical components including the low voltage battery and the high voltage batteries in the event of a vehicle accident. By isolating electrical components, the multipoint safety isolation system reduces the electrical hazard posed by the vehicle electrical system after an accident.

The multipoint safety isolation system minimizes the safety hazard posed by electrical components by reducing the time required to disable and/or isolate the electrical components without delay and without the need for user input. For example, if an accident occurs and a passenger is incapacitated, the electrical components may be isolated with minimal human input and minimal physical access to the vehicle which reduces electrical hazard risk to an emergency responder. In addition, when an emergency responder arrives at the scene of an accident, it is critical that the electrical components are isolated and/or disabled within seconds to enhance the safety of the driver, the passengers and the emergency responder. The multipoint safety isolation system may also take precautions before the arrival of an emergency responder.

The multipoint safety isolation system provides indicators so that emergency responders may quickly locate the one or more isolation triggers. The indicators provide the emergency responder audio and/or visual cues to quickly locate the one or more isolation triggers so they are more easily located in the event of an accident and, thereby, significantly reduce the amount of time needed to physically locate the one or more isolation triggers.

Other benefits and advantages include a standardized location for one or more of the isolation triggers so that an emergency responder knows at least one location of one or more of the isolation triggers. Additional information and situational awareness, such as the status of the electrical systems, may be provided to the emergency responder to ensure to the emergency responder that the electrical components have been properly isolated and the risk of an electrical hazard has been minimized. Therefore, the emergency responder can accurately assess the dangers posed by the vehicle to the driver and/or passengers.

Figure 1:
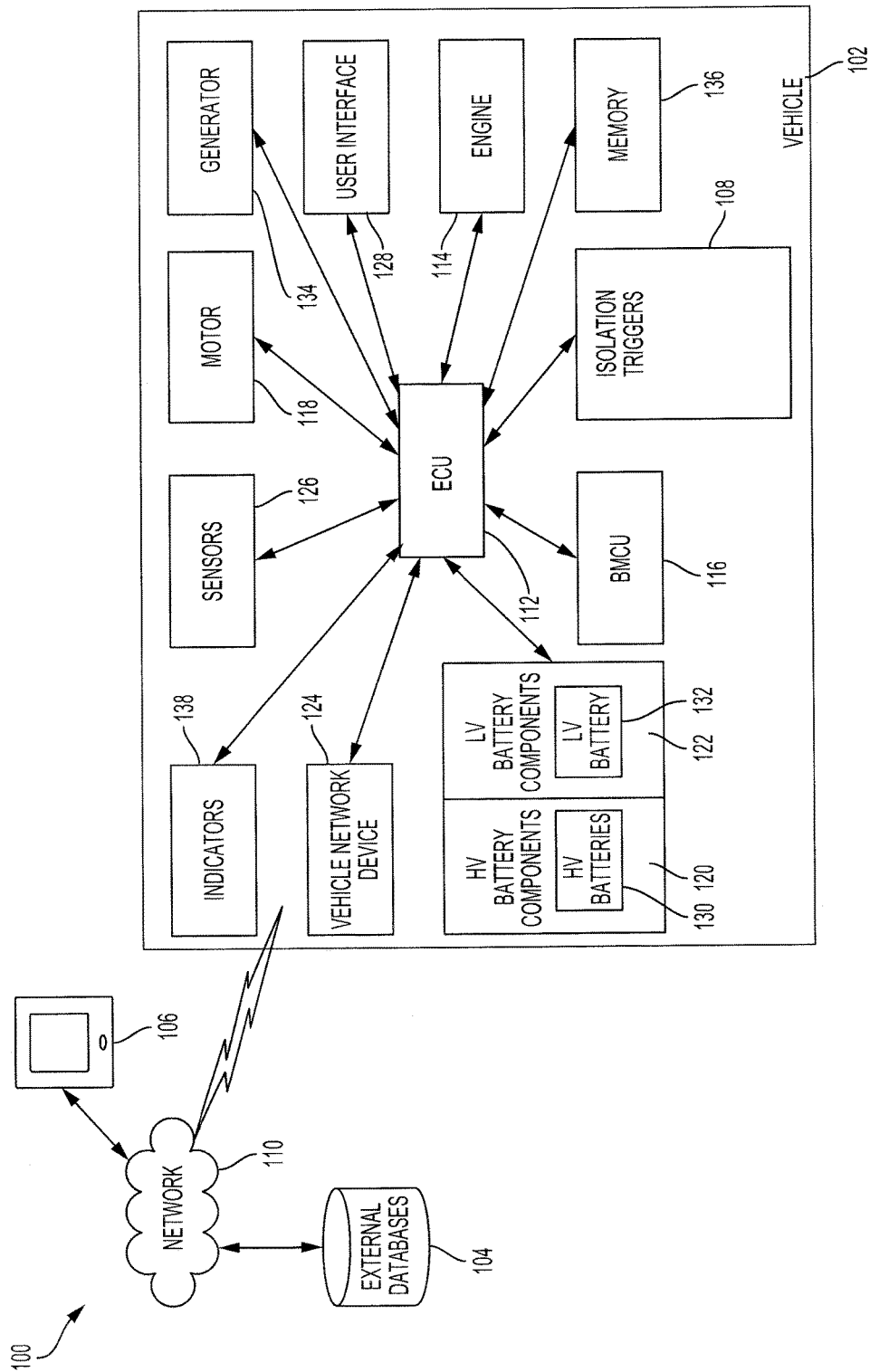
FIG. 1 is a block diagram of a multipoint safety isolation system for a vehicle according to an aspect of the invention.

FIG. 1 is a block diagram of a multipoint isolation system 100 for a vehicle 102. The multipoint isolation system 100 may include one or more computers, processors or electronic control units (ECUs), appropriately programmed, to perform isolation of one or more electrical components of the vehicle 102.

The multipoint safety isolation system 100 includes one or more isolation triggers 108 and/or one or more isolation trigger indicators 138 connected to a vehicle 102. The vehicle 102 is coupled to at least one of a network 110, one or more external databases 104 or a personal device 106.

The vehicle 102 may be a conveyance capable of transporting a person or persons or any material or any permanently or temporarily affixed apparatus. The vehicle 102 may be a self-propelled wheeled conveyance, such as a car, sports utility vehicle, truck, bus, van or other motor or battery driven vehicle. For example, the vehicle 102 may be an electric vehicle, a hybrid vehicle, a plug-in hybrid vehicle or any other type of vehicle that includes high-voltage (HV) battery components 120, low-voltage (LV) battery components 132, a motor 118 and/or a generator 134. Other examples of vehicles include bicycles, trains, planes, or boats and any other form of conveyance that is capable of transportation. The vehicle, e.g., the vehicle 102, may be semi-autonomous or autonomous. That is, the vehicle 102 may be self-maneuvering and navigate without human input. The autonomous and semi-autonomous vehicle may use one or more sensors 126, e.g., a proximity sensor, and a navigation unit, e.g., the navigation unit 122, to drive autonomously or semi-autonomously.

The isolation trigger 108 is a mechanical or an electrical device that when activated electrically disconnects one or more electrical components, e.g., the HV battery components 132 and/or the LV battery components 132, of the vehicle 102 from another electrical component of the vehicle 102. For example, the isolation trigger 108 may be a fuse, an electrical relay, a switch, a cable, or a service plug that includes a fuse, a contactor or a relay. An isolation trigger indicator 138 is an audio/visual device, such as an audio beacon, a runway of lights, a strobe light or bright orange cables, that when activated guides or directs an individual, such as an emergency responder, to at least one of the one or more isolation triggers 108. The isolation trigger indicator 138 provides location information of the one or more isolation triggers to an individual such as an emergency responder. For example, a surface of a high voltage cable may have lights that blink indicating that the cable is an isolation trigger.

The vehicle 102 may be coupled to a network 106. The network 110, such as a local area network (LAN), a wide area network (WAN), a cellular network, a digital short-range communication (DSRC), the Internet, or a combination thereof, connects the vehicle 102 to the one or more external databases 104. The external databases 104 may include databases from different service providers. A service provider may provide vehicle information, such as schematics of various makes and models of different vehicles. The schematics may include electrical layouts of various vehicles. A user device 106, e.g., a smart phone, a cellphone, a touchpad, a tablet, or other communication device, may be coupled to the one or more external databases 104 and may obtain the vehicle information. The personal device 106 may receive information from a user, such as an emergency responder, or from the vehicle 102 that indicates the make, model and/or year of the vehicle 102. The personal device 106 may rapidly access (e.g., within less than 10 seconds) one or more external databases 104 through the network 110 and obtain from the one or more external databases 104 vehicle information. Vehicle information may include schematics of the electrical components of the vehicle including the location and layout of the batteries, cables, connectors, fuses, relay boxes, isolation triggers and/or other electrical components of the vehicle 102.

A database is any collection of pieces of information that is organized for search and retrieval, such as by a computer or a processor, and the database may be organized in tables, schemas, queries, report, or any other data structures. A database may use any number of database management systems. An external database 104 may include a third-party server or website that stores or provides information. The information may include real-time information, periodically updated information, or user-inputted information. A server may be a computer in a network that is used to provide services, such as accessing files or sharing peripherals, to other computers in the network. A website may be a collection of one or more resources associated with a domain name.

The vehicle 102 may include an engine 114, a motor 118, a generator 134, an electronic control unit (ECU) 112, a memory 136, a battery management and control unit (BMCU) 116, high-voltage (HV) battery components 120 and low-voltage (LV) battery components 122. The HV battery components 120 include multiple HV batteries 130. The LV battery components 122 include a LV battery 132. The vehicle 102 may also include a network access device 124, one or more sensors 126, and a user interface 128.

The motor 118 and/or the generator 134 may be an electric motor and an electric generator that converts electrical energy into mechanical power, such as torque, and converts mechanical power into electrical energy. The motor 118 and/or the generator 134 may be coupled to the HV battery components 120. The motor 118 and/or the generator 134 may convert the energy from the HV batteries 130 into mechanical power, and may provide energy back to the HV batteries 130, for example, via regenerative braking. In some implementations, the vehicle 102 may include one or more additional power generation devices, such as the engine 114. The engine 114 combusts fuel to provide power instead of and/or in addition to the power supplied by the motor 118 and/or the generator 134.

The HV battery components 120 may be coupled to the motor 118 and/or the generator 134 and may provide electrical energy to and receive electrical energy from the motor 118 and/or the generator 134. The HV battery components 120 may include one or more rechargeable HV batteries 130 and/or HV cables.

The BMCU 116 may be coupled to the HV battery 130 and control and manage the charging and discharging of the HV battery 130. The BMCU 116, for example, may measure, using battery sensors (not shown), parameters used to determine the state of charge (SOC) of the HV battery 130.

The ECU 112 may be electrically coupled to some or all of the components of the vehicle 102. The ECU 112 may include one or more processors or controllers specifically designed for automotive systems. The functions of the ECU 112 may be implemented in a single ECU or in multiple ECUs. The ECU 112 may receive data from one or more components and control the operations of the one or more components based on the received or determined data. For example, the ECU 112 may receive data from the personal device 106, one or more sensors 126, and/or a network access device 124 and integrate the data received from each of the devices to activate the one or more isolation triggers 108. The ECU 112 may control the operations of the BMCU 116 to charge and discharge the battery 120.

The ECU 112 may be coupled to a user interface 128 that performs user inputs and outputs. The user interface 128 displays, for example, notifications of any requests to activate the one or more isolation triggers and/or status information related to the HV and LV battery components. The user interface 128 may include any device capable of receiving user input, such as a button, a dial, a microphone, a touchpad, or a touch screen, and/or any device capable of output, e.g., a display, a speaker, or a refreshable braille display. The user interface 128 allows a driver or a passenger of the vehicle 102 to communicate with the ECU 112. For example, the driver may be able to provide data to the ECU 112 and/or receive feedback from the ECU 112 via the user interface 128.

The memory 136 may be coupled to the ECU 112. The memory 136 may store instructions to execute on the ECU 112 and may include one or more of a RAM or other volatile or non-volatile memory. The memory 136 may be a non-transitory memory or a data storage device, such as a hard disk drive, a solid-state disk drive, a hybrid disk drive, or other appropriate data storage, and may further store machine-readable instructions, which may be loaded and executed by the ECU 112.

The network access device 124 may include a communication port or channel, such as one or more of a Wi-Fi unit, a Bluetooth® unit, a Radio Frequency Identification (RFID) tag or reader, a DSRC unit, or a cellular network unit for accessing a cellular network (such as 3G or 4G). The network access device 124 may transmit data to and receive data from devices and systems not directly connected to the vehicle 102. For example, the ECU 112 may communicate with the external databases 104. Furthermore, the network access device 124 may access the network 106, to which the external databases 104 are also connected.

The one or more sensors 126 may detect the potential for an electrical hazard related to a vehicle collision or fire, and may include a collision impact sensor and/or a thermal sensor. A collision impact sensor may be configured to detect a vehicle collision. One or more collision impact sensors may be positioned on the bumper, doors or other locations on the exterior of the vehicle to detect when a vehicle has been involved in a collision, e.g., by measuring a gravitational force (G-Force) of an impact. A thermal sensor may be configured to detect a fire within a vehicle, e.g., by measuring a temperature. The one or more sensors 126 may detect when one or more airbags are deployed.

Figure 2:
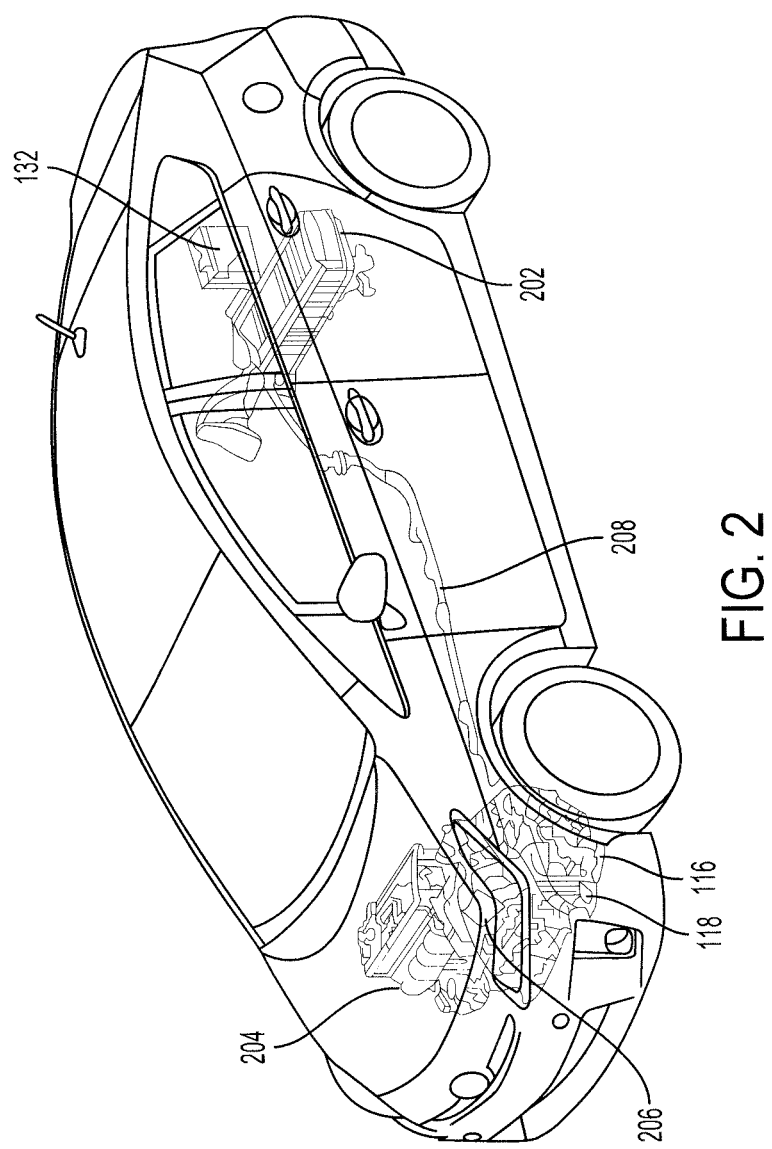
FIG. 2 is an illustration of an inside perspective view of an example vehicle showing a universally located isolation trigger according to an aspect of the invention.

FIG. 2 is an illustration of an inside perspective view of a vehicle 102 showing a universally located isolation trigger 202. One or more computers or data processing apparatuses, for example, the ECU 112 of the vehicle 102, appropriately programmed, may activate the universally located isolation trigger 204 to isolate one or more electrical components of the vehicle 102.

The vehicle 102 includes an electrical system 200. The electrical system 200 includes high voltage battery components 120, low voltage battery components 122, an electric motor 118, an electric generator 134, an inventor/converter 206 and power cables 208. The HV battery components 120 include an HV battery pack 202 that has multiple HV batteries 130. The HV batteries 130 may be Nickel Metal Hydride (NiMH), Lithium Ion (Li-Ion), or any other chemistry. The LV battery components 122 include an LV battery 132. Typically, the standard LV battery 132 is 12 volts.

The power cables 208 carry high-voltage Direct Current (DC) between the HV battery pack 202, the inverter/converter 206, and the A/C compressor 302. The inverter/converter 206 converts Alternating Current (AC) from the electric generator 134 and the electric motor 118 to DC that recharges the HV battery pack 202.

At least one of the one or more isolation triggers 108 is a universally located isolation trigger 204. A universally located isolation trigger 204 is an isolation trigger that is located in a particular location of a vehicle 102 and is in a similar location for other vehicles. The universally located isolation trigger 204 is located in an easily accessible location, for example, under the hood and located near the engine 114 or the LV battery 132, and is located in a same or substantially similar position across various vehicles of different makes, models, years and brands. The particular location may be established and agreed upon by a standardization board and communicated to various vehicle manufacturers and emergency responders. The universally located isolation trigger 204 allows an emergency responder to have knowledge of the location of at least one of the one or more isolation triggers 108. A mechanism may be coupled to an isolation trigger that prevents accidental activation of the isolation trigger.

Figure 3:
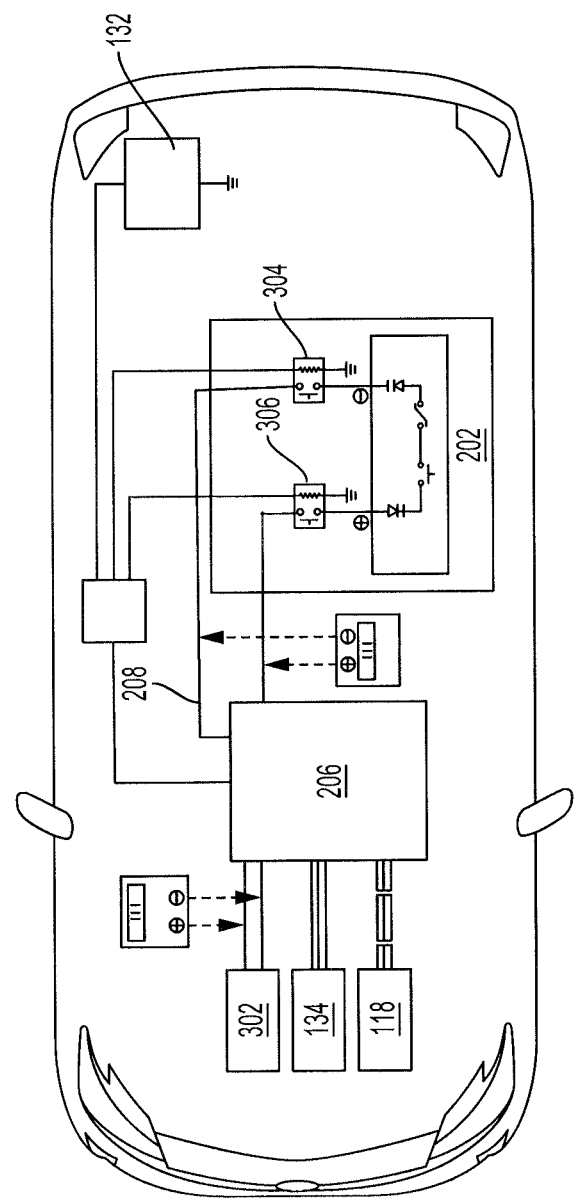
FIG. 3 is a schematic diagram of an example electrical system of a vehicle according to an aspect of the invention.

FIG. 3 is a schematic diagram of the electrical system 200. One or more computers or data processing apparatuses, for example, the ECU 112 of the vehicle 102 or the personal device 106, appropriately programmed, may activate the one or more isolation triggers 108 to isolate the one or more electrical components of the electrical system 200.

The positive and negative high voltage power cables 208 of the electrical system 200 are connected to the HV battery pack 202 and are controlled by one or more vehicle shutoff relays 304 and 306. The one or more vehicle shutoff relays 304 and 306 stop electrical flow from leaving the HV battery pack 202 when the vehicle 102 is shutoff. The one or more vehicle shutoff relays 304 and 306 may be activated when an isolation trigger is activated.

Figure 4:
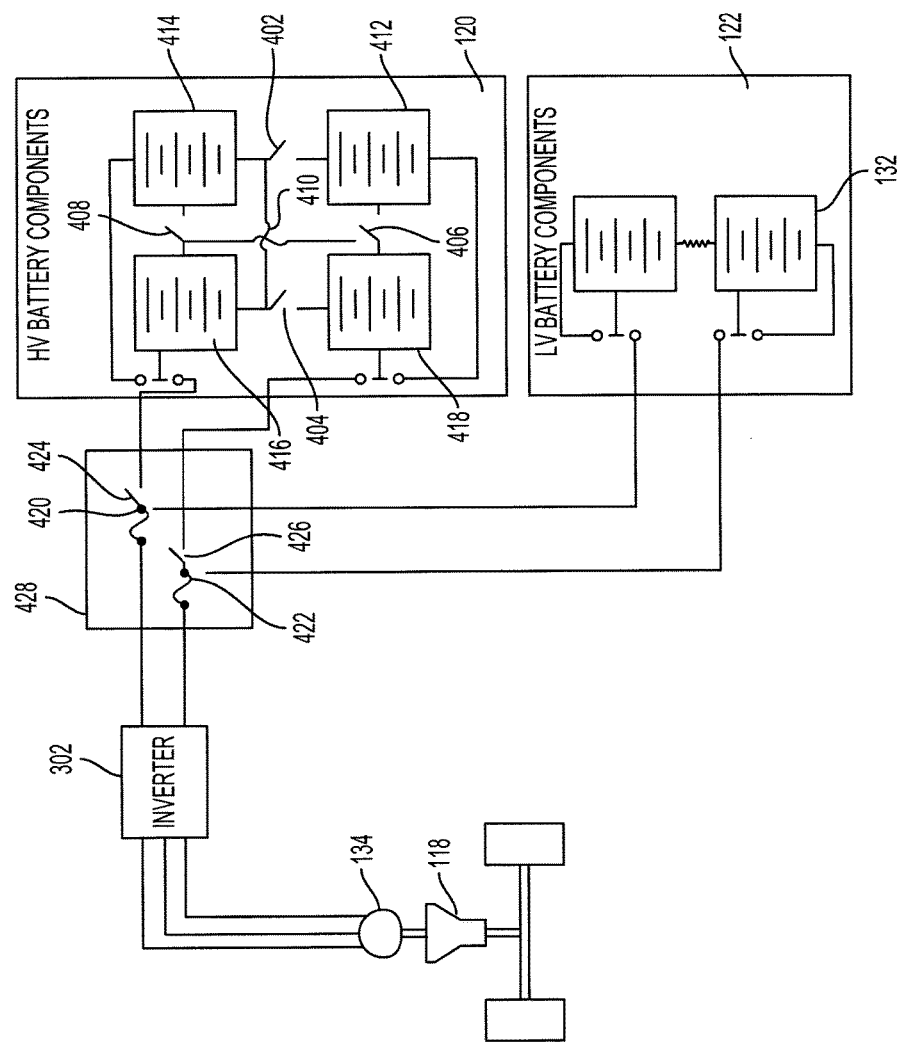
FIG. 4 is a circuit diagram of battery components of an example electrical system of a vehicle according to an aspect of the invention.

FIG. 4 is a circuit diagram of the electrical system 200. One or more computers or data processing apparatuses, for example, the ECU 112 of the vehicle 102, appropriately programmed, may control, manage and isolate the one or more electrical components of the electrical system 200 when an isolation trigger, e.g., the universally located isolation trigger 204, is activated.

The HV battery components 120 include an HV battery pack 202. The HV battery pack 202 has a total voltage, e.g., a total voltage of 274 volts. The total voltage may be discretized into safer voltage levels that are less than half the total voltage by subdividing the HV battery pack 202 into multiple HV subpacks, e.g., into four HV subpacks 412, 414, 416 and 418, that may be connected in series. Each of the HV subpacks has one or more HV batteries that may be connected in series to form the HV subpack. The number of HV batteries in each HV subpack is the same. In some implementations, the HV subpacks may be grouped together, and the number of HV subpacks in a group may be different for each group of HV subpacks and may depend on design constraints.

A subpack relay may be in between HV subpacks or may be in between groups of one or more HV subpacks. When the subpack relays are in the open position, the HV subpacks or groups of HV subpacks are disconnected and segregated from the other HV subpacks or groups of HV subpacks so that the total voltage level is discretized into modules that each individually have a lower voltage level than the total voltage level which reduces the overall potential of an electrical hazard risk in an accident. When in the closed position, the subpack relays electrically connect all the HV subpacks. For example, the HV subpacks 412, 414, 416 and 418 are electrically connected to each other across one or more subpack relays 402, 404, 406 and 408, when the one or more subpack relays 402, 404, 406 and 408 are in the closed position.

The one or more isolation triggers 108 may cause the ECU 112 to place the one or more subpack relays 402, 404, 406 and 408 into the open position to discretize the HV battery pack 202 into multiple HV subpacks 412, 414, 416 and 418. The ECU 112 may have the one or more subpack relays 402, 404, 406 and 408 remain in the closed position if the ECU 112 determines that there is no accident.

The HV battery pack 202 may have one or more fuses, e.g., fuse 410. A fuse is a type of resistor that acts as a sacrificial device to provide overcurrent protection of the load and/or the source circuit. The fuse has a metal wire or strip that melts, interrupting the circuit that the fuse connects when too much current flows through.

The one or more fuses 410 opens the electrical connection between the multiple subpacks when shorted to discretize the HV battery pack 202 into the multiple HV subpacks 412, 414, 416 and 418. The one or more isolation triggers 108 short the one or more fuses 410 when activated.

The HV battery components 120 and the LV battery components 122 may be connected to an HV/LV main relay box 428. One or more fuses, e.g., fuses 420 and 422, and one or more relays, e.g., relays 424 and 426, within the HV/LV main relay box 428 may electrically connect the HV battery components 120 and the LV battery components 122 including the LV battery 132. When activated, the one or more isolation triggers 108 may short the one or more fuses 420 and 422 in the HV/LV main relay box 428 and/or open the one or more relays 424 and 426 to sever and/or electrically disconnect the connection between the HV battery components 120 and the LV battery components 122 to reduce the potential of an electrical hazard and isolate the HV battery pack 202 from the LV battery 132.

When a fuse is shorted, a user may replace the fuse to reestablish electrical connection between disconnected electrical components, such as between the HV battery pack 202 and the LV battery 132 and/or between the HV battery subpacks 412, 414, 416 and 418. When the one or more relays are opened, a user may subsequently close an open relay by sending a signal to the open relay to reconnect the HV battery pack 202 with the LV battery 132 and/or the HV battery subpacks 412, 414, 416 and 418.

Figure 5:
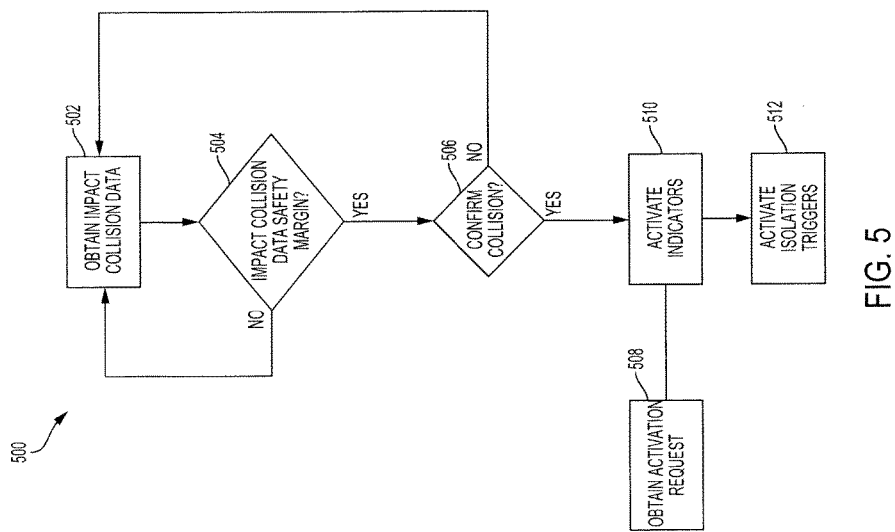
FIG. 5 is a flow diagram of an example process for isolating electrical components of a vehicle according to an aspect of the invention.

FIG. 5 is an example process for activating the one or more isolation triggers to isolate the electrical components. The one or more computers or data processing apparatuses, for example, the ECU 112 of the vehicle 102, appropriately programmed, may control, manage and isolate the one or more electrical components of the vehicle 102.

The multipoint safety isolation system 100 activates the one or more isolation triggers 108 and/or one or more isolation trigger indicators 138 in response to an activation request. An activation request may be triggered by an accident, e.g., a collision, a fire or other hazardous situation, or by an individual, a driver, a passenger or an emergency responder.

The multipoint safety isolation system 100 may detect a hazardous situation based on impact collision data including a degree of impact and/or thermal data including a measure of temperature of the vehicle 102 (502). The multipoint safety isolation system 100 may measure a degree of impact caused by another object, such as another vehicle or a guardrail, to the vehicle 102, or the temperature inside and outside the vehicle 102. The one or more sensors 126 positioned throughout the vehicle 102 may obtain and collect the impact collision data and/or the thermal data. The multipoint safety isolation system 100 may compare the degree of impact and/or temperature of the vehicle 102 to a threshold value, e.g., 3.25 G's or 400 degrees Celsius (504). If the degree of impact and/or temperature of the vehicle 102 is greater than or equal to the threshold value, the multipoint safety isolation system 100 determines that there is a hazardous situation. If the degree of impact is less than the threshold value, the multipoint safety isolation system 100 determines that there is not a hazardous situation.

If the multipoint safety isolation system 100 determines that there is a hazardous situation, such as a collision or a fire, the multipoint safety isolation system 100 may send a notification to the user interface 128 of the vehicle (506). The notification may request confirmation that there is a hazardous situation. If the multipoint safety isolation system 100 obtains confirmation, the multipoint safety isolation system 100 may activate one or more isolation trigger indicators 138 (508). The multipoint safety isolation system 100 may receive user input, e.g., voice confirmation or a user selection, from a user through the user interface 128 that confirms a hazardous situation. If the multipoint safety isolation system 100 determines that there is not a hazardous situation, e.g., the collision is not confirmed, the multipoint safety isolation system 100 continues monitoring for a hazardous situation. If the multipoint safety isolation system 100 confirms that there is a hazardous situation, the multipoint safety isolation system 100 initiates an activation request.

In some implementations, the multipoint safety isolation system 100 sends the notification to a third-party service provider who may attempt to verify if there is a hazardous situation. In some implementations, the multipoint safety isolation system 100 automatically confirms a hazardous situation if no response is received within a threshold time limit, e.g., five minutes, from sending the confirmation request. For example, no response or activation by the user may indicate that the user is injured or unable to activate the multipoint safety isolation system 100 and an activation request may be automatically activated or transmitted.

The multipoint safety isolation system 100 may obtain an activation request (508) from a personal device 106, such as a driver's cell phone or a personal device of an emergency responder, or from direct activation of one of the one or more isolation triggers 108, e.g., the universally located isolation trigger 204. The activation request is a request to activate the one or more isolation trigger indicators 138 and/or the one or more isolation triggers 108.

An isolation trigger indicator 138 is an audio/visual cue that indicates to an individual, such as an emergency responder, the location of an isolation trigger 108. The isolation trigger indicator 138 may be a light, e.g., a strobing light or a runway of lights, that is located within proximity of one or more of the isolation triggers 108 and/or lights up a pathway directed toward the location of one or more isolation triggers 108. In some implementations, the isolation trigger indicator 138 is an audio cue, such as a tone. The audio sound or frequency of the cue may change based on a distance between the location of the isolation trigger 108 and a personal device 106 that activated the isolation trigger indicator 138. For example, as the distance between the personal device 106 and the location of the isolation trigger 108 decreases, the frequency of the audio sound increases and as the distance increases the frequency of the audio sound decreases.

An isolation trigger connects to the multiple low voltage battery components 122 and the multiple high voltage battery components 120 and isolates at least one of the LV battery 132 from the HV battery pack 202 or a subpack of HV batteries from another subpack of HV batteries when activated.

The multipoint safety isolation system 100 may obtain a vehicle information request to determine the location of one or more isolation triggers 108 for a vehicle 102 in a hazardous situation. The vehicle information request may include vehicle identification information, such as a make, year, and/or model of a vehicle 102. Other vehicle identification information may include a license plate number and/or a vehicle identification number. The multipoint safety isolation system 100 may obtain the vehicle information request from a personal device 106. For example, the multipoint safety isolation system 100 may display input fields in which a user on a personal device 106 may input information regarding the vehicle 102.

The multipoint safety isolation system 100 obtains vehicle activation information using the vehicle identification information by, for example, sending the vehicle information request to an external database 104 where the vehicle identification information is associated with the vehicle 102, and retrieving the vehicle activation information from the external database 104. The vehicle activation information includes a schematic of the vehicle 102 associated with the vehicle identification information. The schematic includes information describing the location of one or more isolation triggers 108 and/or the electrical multipoint safety isolation system 100 of the vehicle, e.g., the location of the HV battery components 120 and/or the LV battery components 122.

In some implementations, the multipoint safety isolation system 100 previously stored vehicle activation information for various vehicles in the personal device 106. The multipoint safety isolation system 100 may access a memory of the personal device 106 and identify the vehicle activation information for a vehicle 102 based on the previously stored vehicle activation information and the obtained vehicle information.

Figure 6:
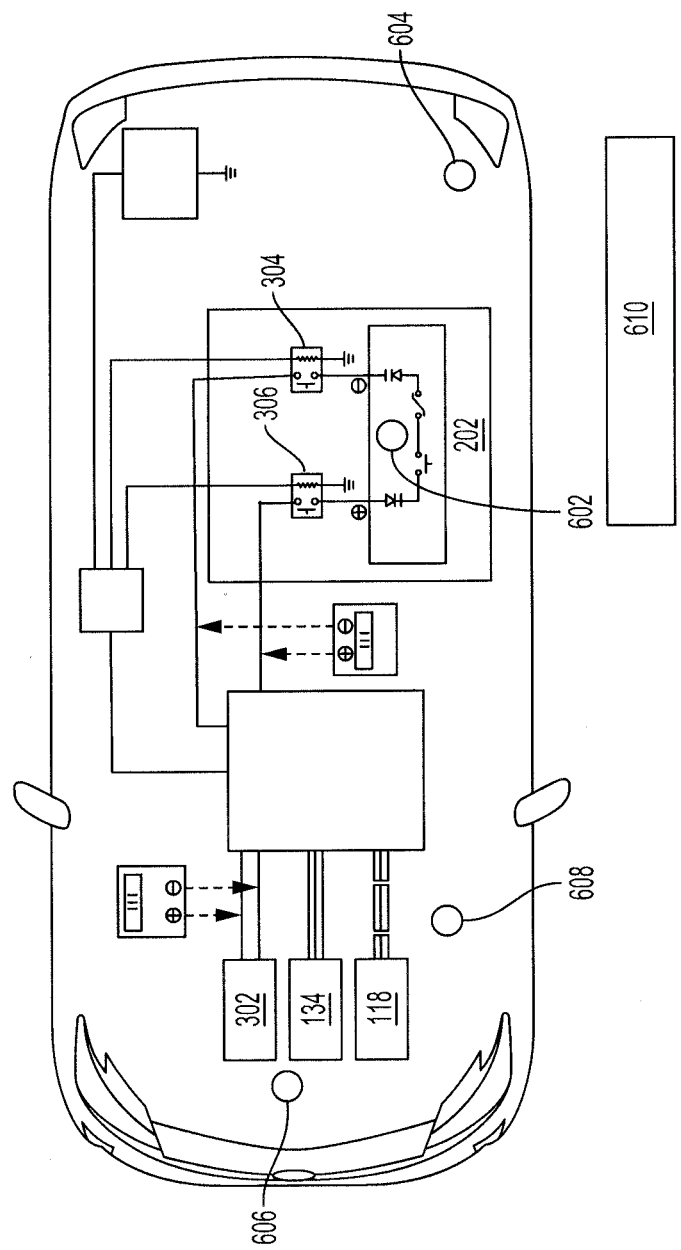
FIG. 6 is an illustration of an example graphic user interface (GUI) displaying a schematic of a vehicle according to an aspect of the invention.

The multipoint safety isolation system 100 may display the vehicle 102 activation information for the vehicle 102 on the personal device 106, e.g., on a graphical user interface (GUI) as shown in FIG. 6. The display may include a display indicator, e.g., display indicators 602, 604, 606 and 608, for each of the one or more isolation triggers 108 and/or the one or more isolation trigger indicators 138 on the vehicle 102. The display may include the schematic of the vehicle 102, the electrical components of the vehicle 102 and the one or more display indicators for each of the one or more isolation triggers 108 and/or the one or more isolation trigger indicators 138. Each of the one or more display indicators 602, 604, 606 and 608 may correspond to an isolation trigger 108 and/or an isolation trigger indicator 138 on the vehicle 102. The multipoint safety isolation system 100 may receive a selection of the one of the one or more display indicators 602, 604, 606 and 608 that triggers an activation request for a corresponding isolation trigger 108 and/or isolation trigger indicator 138.

The personal device 106 may receive the selection of one of the one or more display indicators 602, 604, 606 and 608 and transmit a signal to activate the one or more isolation triggers 108 and/or isolation trigger indicators 138. The signal may be transmitted wirelessly to the one or more isolation triggers 108 and/or the isolation trigger indicators 138.

An individual may physically activate the one of the one or more isolation triggers 108 to isolate the one or more electrical components of the vehicle 102. For example, the one or more isolation trigger indicators 138, such as a bright orange cable, may direct the attention of the individual to the one or more isolation triggers 108, such as a particular cable that when cut segregates and/or isolates the one or more electrical components. In some implementations, an individual may contact a third-party service provider to activate the one or more isolation triggers 108 or directly activate the one or more isolation triggers 108 through the user interface 128, e.g., via voice commands or user interface elements.

The multipoint safety isolation system 100 activates the one or more isolation trigger indicators 138 (510) and/or the one or more isolation triggers 108 (512). The activation signal may be sent wirelessly or over a wired connection to the one or more isolation trigger indicators 138 and/or the one or more isolation triggers 108.

The multipoint safety isolation system 100 may shut off generation of electrical power in the vehicle 102 by, for example, blowing a vehicle fuse or flipping a circuit breaker. If a fuse is blown, the element inside the fuse becomes melted. An individual, such as a mechanic or a driver, must replace the vehicle fuse or flip the circuit breaker to restore the vehicle's capability to generate electrical power. The vehicle fuse or the circuit breaker may be located in a panel located underneath the steering wheel in proximity to the driver's side of the vehicle.

The multipoint safety isolation system 100 isolates at least one of the LV battery from the HV battery pack and/or a subpack of HV batteries from another subpack of HV batteries by disconnecting one or more electrical connections. The multipoint safety isolation system 100 may disconnect the one or more electrical connections by toggling one or more relays, e.g., subpack relays 402, 404, 406 and 408, and/or blowing a fuse, e.g., fuse 410.

The multipoint safety isolation system 100 may disconnect one or more electrical connections between the LV battery and the HV battery pack 202 including the one or more HV batteries 130 and/or between different subpacks of HV batteries to isolate the one or more electrical components of the vehicle 102. A subpack of HV batteries includes at least one HV battery and may include multiple HV batteries. Each of the different subpacks of HV batteries contains a discretized voltage level that is less than the total voltage value of the combined HV batteries. The discretized voltage level across the different subpacks of HV batteries may be the same or different among all the different subpacks. For example, the HV battery pack 202 may have a total voltage of 201.6 Volts and the HV battery pack may be formed from 28 lower voltage subpacks with each of the 28 lower voltage subpacks having a discretized voltage level of 7.2 Volts.

The multipoint safety isolation system 100 may toggle the one or more relays 424 and 426 to an open position to electrically disconnect the LV battery 132 from the HV battery pack 202 and/or may toggle one or more subpack relays 402, 404, 406 and 408 to electrically disconnect a subpack of HV batteries from another subpack of HV batteries. The one or more relays 424 and 426 may be positioned within a service plug or in the HV/LV main relay box 428. The multipoint safety isolation system 100 may toggle the one or more relays 424 and 426 and/or subpack relays 402, 404, 406 and 408 to a closed position if the multipoint safety isolation system 100 determines that there is no potential for an electrical hazard. For example, a mechanic at a designated vehicle dealership may send a signal to the one or more relays 424 and 426 and/or subpack relays 402, 404, 406 and 408 to toggle between the open position and the close position to electrically disconnect or connect the electrical components.

The multipoint safety isolation system 100 may isolate the one or more electrical components based on at least one of the thermal data, impact collision data, and/or user input by toggling one or more particular relays and/or blowing one or more particular fuses. For example, the multipoint safety isolation system 100 may determine a degree of severity of a hazardous situation based on the thermal data and the impact collision data, and in response to the degree of severity segregate the HV batteries into a particular number of subpacks with each subpack having a particular voltage level. If the vehicle 102 is in a minor accident with no fire hazard, e.g., a low G-force impact and no increase in temperature, the multipoint isolation system 100 may only isolate the HV battery pack 202 from the LV battery 132, whereas, if there is a fire hazard, e.g., the temperatures is above a threshold value, the multipoint isolation system 100 may additionally isolate the HV battery pack 202 into the four subpacks of HV batteries 412, 414, 416 and 418.

The multipoint safety isolation system 100 may provide an indication that the one or more isolation triggers 108 have been activated after the electrical components of the vehicle 102 have been disconnected. The multipoint safety isolation system 100 may send a test signal through the electrical system of the vehicle 102 to determine if the LV battery 132 is segregated from the HV battery pack 202 and/or the subpacks of HV batteries have been disconnected from each other.

In response to determining that the electrical components are isolated, the multipoint safety isolation system 100 may change a state of the one or more isolation trigger indicators 138 to indicate that the electrical components are isolated. For example, a color of a strobing light may change, the audio beacon may change tone or frequency, and/or an indication may be sent to the personal device 102. In some implementations, the one or isolation trigger indicators 138 remain activated until the one or more electrical components are isolated, and when the one or more electrical components are isolated, the one or more trigger indicators 138 are disabled.

FIG. 6 is an illustration of an example graphical user interface (GUI) display 600 of a personal device 106. The one or more computers or the one or more data processing apparatuses, for example, the personal device 106 of the multipoint safety isolation system 100 of FIG. 1, appropriately programmed may implement the GUI display 600 on the personal device 106.

The GUI display 600 may be configured to display notifications, schematics of the vehicle and/or status information and/or communicate information via audio. The notifications may include a request to confirm an activation request for one or more isolation triggers 108. The schematics include information describing the location of the one or more isolation triggers 108 and/or the one or more isolation trigger indicators 138. A user interface element, such as the display indicators 602, 604, 606 and 608, correspond to each of the one or more isolation triggers 108 and/or the one or more isolation trigger indicators 138. The GUI is configured to receive a selection of one of the display indicators 602, 604, 606 and 608 and/or voice command that initiates an activation request to isolate the one or more electrical components of the vehicle 102. The GUI 600 may have a separate user interface element, such as the display indicator 610, and/or voice command that activates all of the one or more isolation triggers 108 and/or all of the one or more isolation trigger indicators 138 simultaneously. The schematics may include additional information such as a schematic of the electrical system of the vehicle that includes the location of battery packs, high voltage cables, inverter and/or the generator.

Status information may include the status of the isolation of the one or more electrical components. The GUI 600 may highlight the one or more regions that the one or more electrical components have been segregated and/or isolated into on the schematic of the vehicle 102. For example, the LV battery components 122 may be overlayed with a blue color and portions of the HV battery components 120 may be overlayed with a red color and a green color that indicates the LV battery components 122 and the different portions of the HV battery components 120 that have been successfully isolated from each other. The GUI 600 may highlight the one or more regions that the one or more electrical components have failed to isolate after an activation request has been initiated. For example, a region representing a subpack of the HV batteries may flash red if an activation request was initiated but the one or more sensors 126 indicate that the particular subpack of HV batteries is electrically connected to another subpack of HV batteries.

Figure 7:
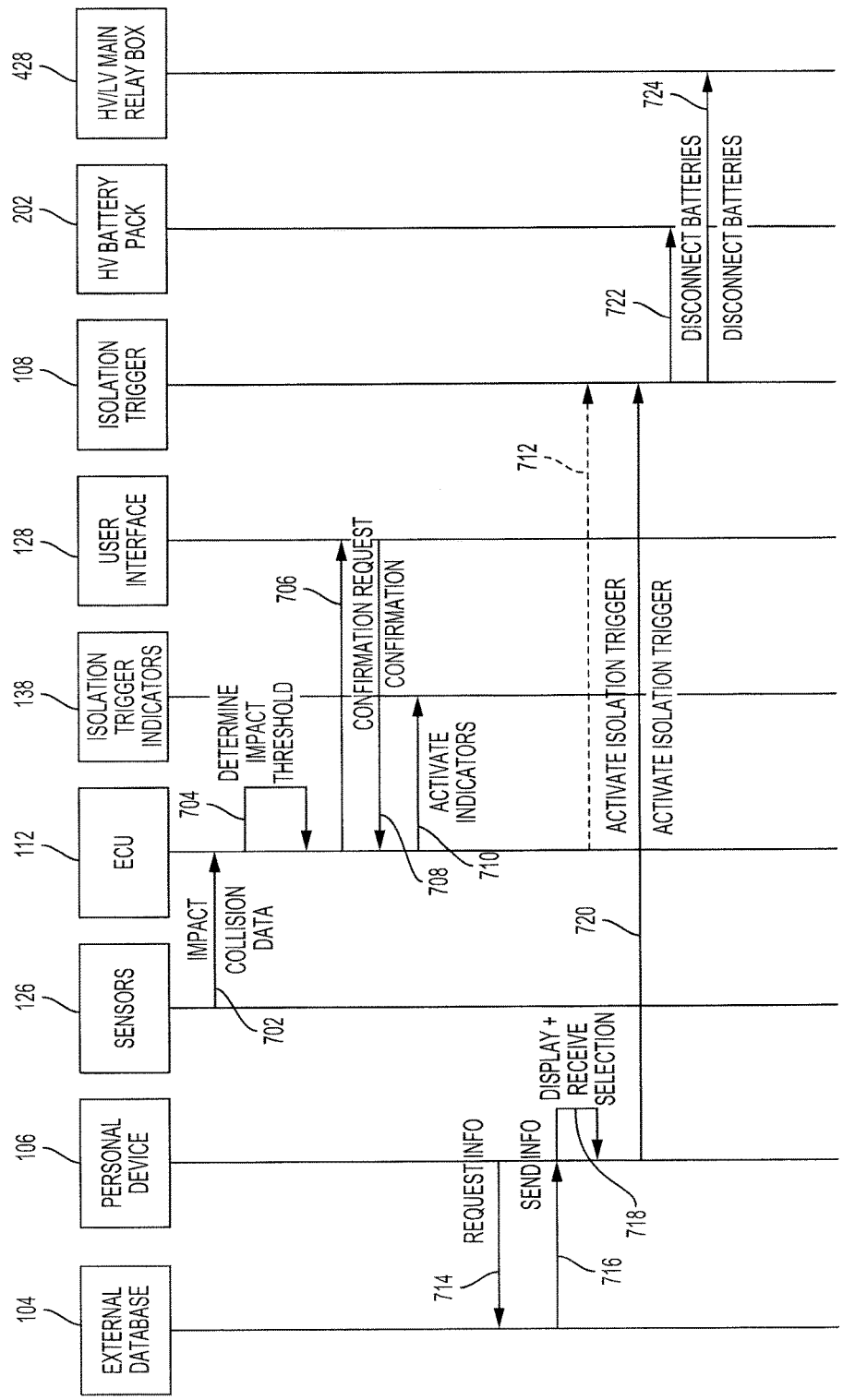
FIG. 7 is a sequence diagram for isolating electrical components of a vehicle according to an aspect of the invention.

FIG. 7 is an example sequence 700 of component interactions of the multipoint isolation system 100 to isolate the one or more electrical components. The one or more computers or one or more data processing apparatuses, for example, the ECU 112 or the personal device 106 of the multipoint safety isolation system 100 of FIG. 1, appropriately programmed, may perform the sequence 700 of interactions to isolate the one or more electrical components.

The multipoint safety isolation system 100 activates the one or more of the isolation triggers 100 based on an activation request. The activation request is obtained from a personal device 106 of a user, such as an emergency responder, or initiated by the multipoint isolation system 100.

A user of a personal device 106 may provide vehicle information, such as the make, model, and year of a vehicle, into the personal device 106 to obtain vehicle activation information. The personal device 106 may send a request that includes the vehicle identification information to obtain vehicle activation information from one or more external databases 104 (714). The one or more external devices 104 sends the requested information to the personal device 106 (716). The personal device 106 displays the vehicle activation information on the graphical user interface of the personal device 106. The request and the receipt of the requested information may advantageously take less than 10 seconds due to the urgency and need for obtaining this information quickly. The personal device 106 receives a user input of an activation request from an emergency responder (718) and sends a signal to one or more isolation triggers 108 to isolate one or more electrical components of the vehicle 102 (720).

The one or more sensors 126 monitor and collect impact collision data and thermal data. The one or more sensors 126 send the collected impact collision data and/or thermal data to the ECU 112 (702). The ECU 112 compares the impact collision data and/or thermal data to a threshold to determine whether there is a hazard (704) based on a degree of impact that is included in the impact collision data and/or a temperature value included in the thermal data. If the degree of impact is greater than or equal to a threshold value, the ECU 112 determines that there is a hazardous situation, the ECU 112 may send a confirmation request to the user interface 128 and/or to a third-party to confirm that the one or more isolation triggers 108 and/or the one or more isolation trigger indicators 138 should be activated (706). The user interface 128 sends the confirmation received to the ECU 112 (708). The ECU 112 generates a signal that activates the one or more isolation trigger indicators 138 in response to receiving the confirmation (710). The ECU may generate a signal that activates the one or more isolation triggers 108 (712).

The one or more isolation triggers 108 send signals to the HV battery pack 202 (722) and the HV/LV main relay box 428 (724) to mechanically and/or electrically disconnect the LV battery 132 from the HV battery pack 202 and/or the subpacks of the HV batteries 412, 414, 416 and 418 from each other by toggling the one or more relays and/or subpack relays into an open position and/or shorting a circuit to cause the one or more fuses to be blown.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A multipoint safety isolation system for a vehicle, comprising:
    an isolation device for isolating a low voltage (LV) battery component that includes an LV battery from a high (HV) battery component that includes a HV battery or isolating batteries of the HV battery component to form a plurality of HV battery subpacks;
    an isolation trigger connected to the isolation device and configured to cause the isolation device to isolate the LV battery component from the HV battery component or the batteries of the HV battery component to form the plurality of HV battery subpacks;
    at least one of an audio indicator or a visual indicator that indicates a location of the isolation trigger; and
    an electronic control unit connected to the isolation device, the isolation trigger, and the at least one of the audio indicator or the visual indicator and configured to activate the at least one of the audio indicator or the visual indicator to provide the location of the isolation trigger.

2. The multipoint safety isolation system of claim 1, further comprising:
    a user device having a user display;
    one or more external databases; and
    a network that connects the user device to at least one of the electronic control unit or the one or more external databases.

3. The multipoint safety isolation system of claim 2, wherein the user device is configured to:
    obtain a schematic of the vehicle from the one or more external databases; and display an indicator for the location of the isolation triggers.

4. The multipoint safety isolation system of claim 3, wherein the one or more external databases stores a plurality of schematics for a plurality of vehicles, each schematic of the plurality of schematics corresponding to a vehicle of the plurality of vehicles.

5. The multipoint safety isolation system of claim 3, wherein the user device is further configured to:
display a user interface element for activating the isolation trigger;
receive a selection of the user interface element; and
send a signal to the vehicle to activate the isolation trigger.

6. The multipoint safety isolation system of claim 1, wherein to isolate the LV battery component from the HV battery component or the batteries of the HV battery component to form the plurality of HV battery subpacks the isolation device is configured to:
disconnect one or more electrical connections between the LV battery component and the HV battery component; or
disconnect one or more electrical connections among the batteries of the HV battery component to form the plurality of HV battery subpacks; and
shutoff generation of electrical power.

7. The multipoint safety isolation system of claim 6, wherein to disconnect the one or more electrical connections the isolation device is configured to cause a short of a circuit so that a mechanical fuse is blown.

8. The multipoint safety isolation system of claim 6, wherein to disconnect the one or more electrical connections among the batteries of the HV battery component the isolation device is configured to toggle one or more electrical switches connected among the batteries of the HV battery component, wherein by toggling the switch the HV battery component is electrically segregated into different battery subpacks that each compose of at least one HV battery.

9. The multipoint safety isolation system of claim 1, further comprising:
one or more impact collision sensors configured to detect impact data;
wherein the electronic control unit is further configured to:
compare the impact data to a threshold value;
determine that there was an impact based on the comparison; and
trigger activation of the isolation trigger in response to determining that there was an impact.

10. The multipoint safety isolation system of claim 1, wherein the visual indicator is a pathway of lights that lead to the isolation trigger or the audio indicator is an audio beacon.

11. The multipoint safety isolation system of claim 1, wherein each subpack of the plurality of HV battery subpacks has an equivalent amount of voltage as other subpacks of the plurality of HV battery subpacks.

12. A method for isolating batteries of a vehicle, comprising:
measuring, using one or more sensors, a temperature of an environment within or near the vehicle;
obtaining, by a processor and from the one or more sensors, the temperature of the environment within or near the vehicle;
activating, by the processor, one or more isolation triggers to isolate a low voltage (LV) battery from a plurality of high voltage (HV) batteries when the temperature exceeds a threshold value; and
disconnecting, by the processor, one or more electrical connections between the LV battery and the plurality of HV batteries.

13. The method of claim 12, further comprising:
shutting off generation of electrical power.

14. The method of claim 13, wherein disconnecting the one or more electrical connections includes toggling a relay between the LV battery and the plurality of HV batteries into an open position.

15. The method of claim 13, wherein disconnecting the one or more electrical connections includes causing a short of a circuit so that a mechanical fuse is blown.

16. The method of claim 13, further comprising:
disconnecting one or more electrical connections between a first subset of the plurality of HV batteries and a second subset of the plurality of HV batteries.

17. The method of claim 16, wherein disconnecting the one or more electrical connections between the first subset and the second subset includes sending a wireless signal to one or more electrical relays that are configured to open to disconnect the first subset from the second subset.

18. A method for isolating one or more batteries of a vehicle, comprising:
detecting, using one or more sensors, impact collision data or temperature data;
comparing the impact collision data to a safety margin or the temperature data to a threshold temperature;
determining that the impact collision data exceeds the safety margin or that the temperature data exceeds the threshold temperature;
activating an audio indicator or a visual indicator that indicates or provides a location of an isolation trigger; and
activating the isolation trigger when a signal to activate the isolation trigger is obtained.

* * * * *